United States Patent Office 3,534,127
Patented Oct. 13, 1970

3,534,127
PROCESS FOR THE PREPARATION OF
PHOSPHORYL COMPOUNDS
John D. Spivack, Spring Valley, N.Y., assignor to Geigy
Chemical Corporation, Ardsley, N.Y., a corporation of
New York
No Drawing. Continuation-in-part of application Ser. No.
612,336, Jan. 30, 1967. This application Feb. 27, 1967,
Ser. No. 618,988
Int. Cl. B01j 1/16; C07f 9/12, 9/34
U.S. Cl. 260—968                                    20 Claims

ABSTRACT OF THE DISCLOSURE

Phosphonic and phosphinic acids, esters and halides thereof and phosphine oxides, and the corresponding thio derivatives, of alkylated p-hydroxyphenylalkanes are prepared from alkylated p-hydroxyphenylalkyl halides and phosphorus halides in the presence of a complexing metal halide Lewis acid followed by dissociation of the reaction complex with water or hydrogen sulfide, optionally with in situ ester formation. A typical embodiment is the preparation of 3,5-di-t-butyl-4-hydroxybenzylphosphonic acid from 3,5-di-t-butyl-4-hydroxybenzyl chloride and phosphorus trichloride in the presence of aluminum chloride. The compounds are useful as stabilizers of organic materials or as dyesites for polypropylene.

CROSS REFERENCE

This is a continuation-in-part of Ser. No. 612,336 filed Jan. 30, 1967.

DETAILED DESCRIPTION

The present invention relates to a novel process for the preparation, in superior yields and purity, of certain organic pentavalent phosphorus compounds, more particularly to certain phosphonyl halides, phosphinic acids, phosphinites, phosphonates, phosphine oxides and phosphonate half-esters of alkylated p-hydroxyphenylalkanes, as well as the corresponding thio compounds. Compounds of this type, or derivatives thereof, are known to be useful as stabilizers of organic materials, as dyesites for polyolefins, and as chemical intermediates. Thus, for example, the process of the present invention is useful in preparing phosphorus compounds such as are described in U.S. Pats. Nos. 3,006,945, 3,155,704, 3,270,091 and 3,281,505, and copending applications Ser. No. 510,065, now U.S. Pat. No. 3,310,575, and Ser No. 612,336, and well as others.

In accordance with the process which constitutes the present invention, an alkylated hydroxyphenylalkyl halide of the formula:

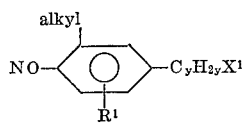

(I)

wherein $R^1$ is hydrogen or alkyl, $X^1$ is chloro, bromo or iodo, and $y$ has a value of from 1 to 18 inclusive, is treated in a nonaqueous inert aprotic solvent, with a phosphorus halide (alternatively named as a halophosphine) of the formula

(II)

wherein $X^2$ is chloro, bromo or iodo and each of $R^2$ and $R^3$ is chloro, bromo, iodo, alkyl, aryl, alkoxy or aryloxy, in the presence of a complexing metal halide Lewis acid. The resultant reaction complex is, in a first embodiment of this invention, then treated with a quantity of a compound of the formula $H_2Z$, in which Z is an oxygen atom or a sulfur atom, sufficient to at least dissociate the reaction complex and thereby liberate the phosphoryl or thiophosphoryl compound. When the phosphorus halide reactant of Formula II is a trihalophosphine and the quantity of $H_2Z$ employed is just sufficient to dissociate the reaction complex, the product will thus be a phosphoryl or thiophosphoryl dihalide whereas if an excess of $H_2Z$ is employed, the product will be the corresponding phosphonic or thiophosphonic acid. If the phosphorus halide reactant of Formula II is a dihaliphosphine and the quantity of $H_2Z$ employed is just sufficient to dissociate the reaction complex, the product will be the phosphoryl or thiophosphoryl monohalide whereas if an excess of $H_2Z$ is employed the product will be corresponding phosphinic or thiophosphinic acid. If the phosphorus halide is a monohalophosphine, the product upon dissociation of the reaction complex will be a phosphine oxide or phosphine sulfide irrespective of whether or not an excess of $H_2Z$ is employed. These reactions may be represented as follows:

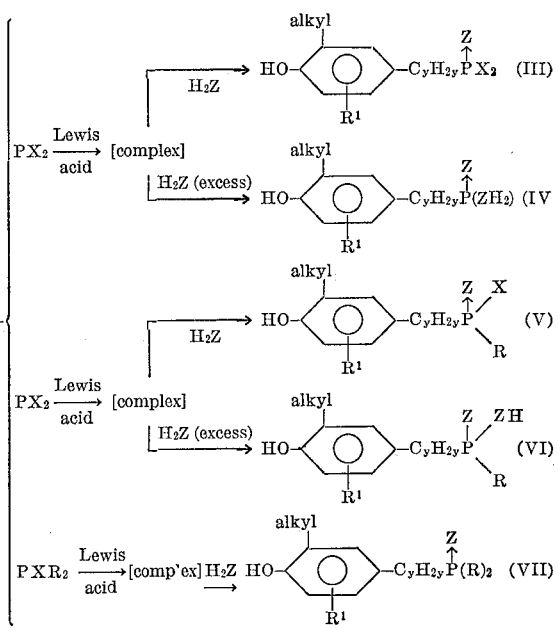

In the foregoing $R^1$, Z and $y$ are previously defined, X is chloro, bromo or iodo and R is alkyl, aryl, alkoxy or aryloxy.

In a second embodiment of the present invention, the reaction complex obtained when the phosphorus halide reactant is a dihalo or trihalophosphine, is treated, prior to the dissociation step, with an alcohol or mercaptan of the formula HZR⁴ wherein R⁴ is alkyl, haloalkyl, hydroxyalkyl, aryl or aralkyl, and then dissociated through treatment with H₂Z as previously described. If in this embodiment the phosphorus halide reactant is a phosphorus trihalide, the product will thus be a phosphonate or thiophosphonate whereas if the phosphorus halide is a dihalophosphine, the product will be a phosphinate or thiophosphinate. These reactions may be represented as follows:

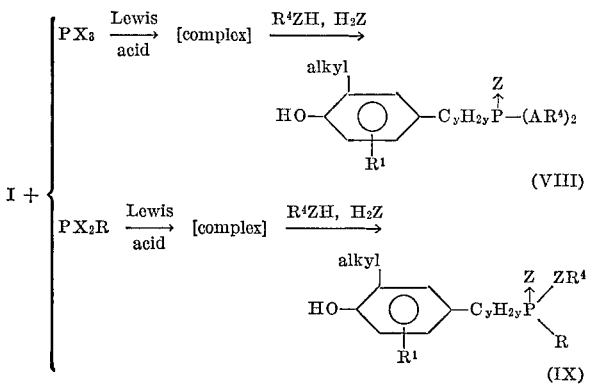

In the foregoing R, R¹, R⁴, Z and y are as previously defined. It is to be appreciated that the atom represented by Z need not be the same in R⁴ZH and in H₂Z. Thus one can employ either an alcohol or a mercaptan with either water or hydrogen sulfide.

It should be noted that phosphinates, phosphonates and particularly phosphonate half esters are also prepared by employing mono- or dialkoxy or aryloxy phosphorus halides.

With greater particularity to the nature of the reactants and conditions of the present invention, the alkylated hydroxyphenyl halide reactant of Formula I may be a chloride, bromide or iodide, generally a chloride. Bridging the halogen atom and the phenyl ring is a branched or straight chain alkylene chain of from 1 to about 18 carbon atoms. In its simplest form, this alkylene group is methylene, which together with the phenyl ring thus constitutes a benzyl group; longer and branch alkylene chains such as isobutylene, dodecylene, octadecylene and the like are however encompassed. The phenyl ring contains an hydroxy group in the para position and an alkyl group on one of the adjacent carbon atoms. A second like or different alkyl group may be optionally present on the other carbon atom adjacent to the hydroxy group or on the carbon atom meta to the hydroxy group and para to the first alkyl group. While the operability of this process is surprising in view of the presence of this hindered phenol arrangement, the length and nature of the alkyl group(s) is by no means critical from a process standpoint. Generally however the alkyl groups contain a maximum of up to about 18 carbon atoms. From the standpoint of the usefulness of the final compounds, the 3,5-di-t-butyl-4-hydroxyphenylalkyl group is preferred.

The phosphorus halide reactant of Formula II is a monohalo, dihalo or trihalophosphine in which the halogen atom(s) is chlorine, bromine or iodide. Although not required, the halogens in a dihalo- or trihalophosphine will generally be the same. Each of the remaining one or two valence bonds in the case of a di- or monohalophosphine, respectively, will bear an alkyl group, an aryl group, an alkoxy group or an aryloxy group. Generally these alkyl and alkoxy groups will contain up to about 30 carbon atoms and may be of a branched or straight chain structure. The aryl and aryloxy groups are aromatic mono and polycarbocyclic structures optionally substituted with inert groups such as alkyl, alkoxy and the like.

While phenyl and phenoxy are the most common species, groups such as tolyl, naphthyl, chrysenyl, anthracyl, t-butylphenyl, and the like, as well as the corresponding aryloxy forms, are embraced.

The foregoing two reactants are generally employed in substantially equimolar amounts although an excess of the phosphorus halide can be employed. These reactants are combined with at least an equimolar amount, and generally a slight excess, of a complexing metal halide Lewis acid as for example aluminum chloride, ferric chloride, stannic chloride, boron trifluoride, titanium chloride, zinc chloride, zirconium chloride and the like. The process is preferably practiced by first dissolving or suspending the metal halide in a non-aqueous inert aprotic solvent such as nitromethane, dichloromethane, nitrobenzene, nitropropanes, chlorobenzene, dichlorobenzenes, s-dichloroethane, tetrachloroethane, perchloroethylene, petroleum ether, carbon disulfide and the like, generally at temperatures at or below 0° C., and then adding the two reactants. The reaction is then allowed to progress, with cooling if necessary, under an inert atmosphere such as nitrogen or helium and non-aqueous conditions.

In accordance with the first embodiment of the invention, the reaction mixture containing the complexed intermediate is then treated with water or hydrogen sulfide. Depending upon the product desired, the water or hydrogen sulfide is added either in a quantity just sufficient to dissociate the complex or in an excess of this amount, the rate of addition being adjusted to avoid an overly rapid generation of heat. The product is isolated through the use of conventional techniques such as solvent extraction, evaporation, centrifugation or the like and further purified if necessary through recrystallization, chromatography or the like.

In the second embodiment of this invention, the reaction mixture containing the complexed intermediate is first treated with an alcohol or mercaptan. This alcohol or mercaptan may be simple alkyl or aryl alcohol or mercaptan such as methanol, ethanethiol, octadecanol, dodecanol, and the like or may be a halogenated alkanol such as 3-chloropropanol, or an alkane polyol such as neoopentylglycol, pentaerythritol or the like. While there is no operative limit on the length of the alkyl chain, it will generally contain up to 30 carbon atoms and more usually up to 18 carbon atoms. Following addition of the alcohol or mercaptan, the reaction complex is dissociated with water or hydrogen sulfide as previously described.

Generally in the practice of the dissociation step, mere addition of water is sufficient. For some particularly tightly bound complexes, the application of heat and/or the addition of base may be necessary. In the case of addition of base, the quantity may be sufficient to neutralize the phosphonic or phospinic acid product and in such instances, the product will be the salt of these acids, the cation being that of the base.

The following examples, which are presented for illustration and not for limitation, will serve to further typify the present invention.

EXAMPLE 1

(3,5-di-t-butyl-4-hydroxybenzyl)-benzenephosphinic acid

A solution of 14.7 g. of anhydrous aluminum chloride in 50 ml. of nitromethane is prepared under nitrogen at −9° C., the temperature of the solution rising to 20° C. The solution is then added to a solution of 25.4 g. of 3,5-di-t-butyl-4-hydroxybenzyl chloride and 18.7 g. of phenylphosphonous dichloride in 50 ml. of nitromethane over a period of 15 minutes at a temperature of from −12 to −10° C. The reacton mixture is stirred at −15 to −12° C. for 40 minutes. One hundred milliliters of water are then added dropwise at a temperature of from 0 to +10° C., the dispersion being stirred for 20 minutes and then extracted twice with 125 ml. portions of diethyl ether. After drying these extracts over anhydrous sodium sulfate, the solvents are removed through evaporation under vacuum, initially at 20 mm. Hg and finally at 1 mm. Hg. The solid is triturated with 200 ml. of n-hexane to give a white crystalline product, M.P. 179–182° C. After crystallization from nitromethane, the melting point is raised to 183–185° C.

*Analysis.*—Calc. for $C_{21}H_{29}O_3P$: C, 69.70%; H, 8.11%; neut. equiv., 360.4. Found: C, 70.13%; H, 8.05%; neut equiv., 359.5.

EXAMPLE 2

3,5-di-t-butyl-4-hydroxybenzylphosphonic acid

A solution of 15.2 g. of anhydrous aluminum chloride (0.114 mol) in 50 ml. of nitromethane is added dropwise at −15° C. and under a nitrogen atmosphere is a solution of 25.4 g. of 3,5-di-t-butyl-4-hydroxybenzyl chloride (0.100 mole and 16.7 g. of phosphorus trichloride (0.125 mole) in 50 ml. of nitromethane over a period of 15 period of 15 minutes. The resultant complex is stirred for 30 minutes, poured with stirring into about 1,000 g. of ice and 100 ml. of water, stirred at 0° C. for 1 hour and extracted with two 300 ml. portions of ether. The aqueous phase is extracted with an additional 300 ml. of ether and the combined ether extracts are dried over anhydrous sodium sulfate and evaporated under vacuum to yield 3,5-di-t-butyl-4-hydroxybenzylphosphonic acid which is further purified through crystallization from n-heptane and recrystallization from acetonitrile, M.P. 200°C. (dec.).

EXAMPLE 3

Dimethyl 3,5-di-t-butyl-4-hydroxybenzylphosphonate

A solution of 25.4 g. of 3,5-di-t-butyl-4-hydroxybenzyl-chloride (0.10 mole) in 50 ml. of nitromethane is added dropwise at −15° C. under nitrogen to a solution of 16.7 g. of phosphorus trichloride (0.125 mole) and 14.7 g. of anhydrous aluminum chloride (0.11 mole) in 100 ml. of nitromethane over a 20 minute period. The complex is stirred at −15° for about 90 minutes and 100 ml. of methanol are then added dropwise over a period of 20 minutes at a temperature initiating at about −20° C. and concluding at about 20° C. The reaction mixture is next heated at reflux temperatures for 1 hour, cooled to room temperature and finally diluted with 300 ml. by volume of water. The aqueous dispersion is extracted with two 200 ml. portions of ether and these extracts are dried over anhydrous sodium sulfate and evaporated to yield dimethyl 3,5-di-t-butyl-4-hydroxybenzylphosphonate which is further purified through trituration with heptane and recrystallization from acetone, M.P. 156–158° C.

Di-(n - butyl) - 3,5 - di - t - butyl - 4 - hydroxybenzylphosphonate (B.P. 182–186° C./0.2 mm. Hg) is obtained in a similar manner if n-butanol is substituted for methanol in the above procedure. Likewise by employing n-octadecanol in place of methanol, there is obtained di-(n-octadecyl) 3,5-di-t-butyl-4-hydroxylbenzylphosphonate, M.P. 57–59° C.

EXAMPLE 4

3,5-di-t-butyl-4-hydroxybenzylphosphonyl dichloride

A solution of 14.7 g. of aluminum chloride (0.110 mole) in 50 ml. of nitromethane is added dropwise over a period of 15 mintues at −20° C. to −15° C. to a solution of 25.4 g. of 3,5-di-t-butyl-4-hydroxybenzyl chloride (0.100 mole) and 16.7 g. of phosphorus trichloride (0.125 mole) in 50 ml. of nitromethane. The reaction mixture is stirred at 15° C. for 30 minutes and 10.5 ml. of water is then added dropwise at −10° C. One hundred milliliters of toluene is next added at the same temperature and the dispersion is centrifuged to remove the hydrated aluminum chloride salts. One hundred milliliters of n-heptane are then added, followed by water until the faint pink color disappears (about 2.5 ml.).

The colorless solution is concentrated by evaporation in vacuum to yield 3,5-di-t-butyl-4-hydroxybenzylphosphonyl dichloride which is crystallized first from heptane and then from carbon tetrachloride, M.P. 109–111° C.

EXAMPLE 5

Methyl (3,5-di-t-butyl-4-hydroxybenzyl)-benzenephosphinate

A solution of 14.7 g. of aluminum chloride (0.110 mole) in 50 ml. of nitromethane is added dropwise over a period of 15 minutes at −15° to −10° C. to a solution of 25.4 g. of 3,5-di-t-butyl-4-hydroxybenzyl chloride (0.100 mole) and 18.7 g. of dichlorophenylphosphine (0.105 mole) in 50 ml. of nitromethane. The mixture is stirred at −15 to −10° for 40 minutes, 32.0 g. (1.00 mole) of methanol are added dropwise at −20° to +5° C. over a 10 minute period and the reaction mixture is stirred for an additional 2 hours at −15 to −10° C. One hundred milliliters of water are then cautiously added at −10° to −15° C. and the reaction dispersion is extracted twice with 200 ml. portions of ether. The combined ether extracts are washed with 100 ml. of water, dried over anhydrous sodium sulfate, evaporated under vacuum to yield methyl (3,5-di-t-butyl-4-hydroxybenzyl)-benzenephosphinate which is further purified through trituration with heptane, M.P. 112–113° C.

EXAMPLE 6 n-Butyl (3,5-di-t-butyl-4-hydroxybenzyl)-benzenephosphinate

A solution of 14.7 g. of aluminum chloride (0.110 mole) in 50 ml. of nitromethane is added dropwise over 15 minutes to a solution of 25.4 g. of 3,5-di-t-butyl-4-hydroxybenzyl chloride (0.100 mole) and 18.7 g. of dichlorophenylphosphine (0.105 mole) in 50 ml. of nitromethane at −15° to −10° C. The mixture is stirred for 50 minutes at −10° C. and 37 g. of n-butanol (0.50 mole) is then added dropwise at 0 to 10° C. over a period of twenty minutes, the reaction mixture being stirred for 90 additional minutes at 10° C. One hundred milliliters of water are then added and the reaction mixture is stirred at 10° to 20° C. for 1 hour. The organic phase is then separated, washed twice with 100 ml. of water containing 20 ml. of 20% aqueous hydrochloric acid, dried over sodium sulfate, and evaporated under vacuum to yield n-butyl (3,5-di-t-butyl-4-hydroxybenzyl) - benzene - phosphinate which is further purified through recrystallization from heptane, M.P. 100–102° C.

EXAMPLE 7 n-Dodecyl (3,5-di-t-butyl-4-hydroxybenzyl)-benzenephosphinate

A solution of 14.7 g. of aluminum chloride (0.110 mole) in 50 ml. of nitromethane added dropwise over a period of 15 minutes to a solution of 25.4 g. of 3,5-di-t-butyl-4-hydroxybenzyl chloride (0.100 mole) and 18.7 g. of dichlorophenylphosphine (0.105 mole) in 50 ml. of nitromethane. The reaction mixture is next stirred at −15° to −10° C. for 50 minutes and 41.1 g. of n-dodecanol (0.220 mole) is then added dropwise at −10° to +10° C., stirring at 20° to 22° C. being continued for ninety minutes. One hundred milliliters of water are then added at a temperature below 20° C. and stirring is continued at 20° C. for 30 minutes. The reaction dispersion is then extracted with 300 ml. of ether, the extracts being washed with 100 ml. of water containing 20 ml. of concentrated hydrochloric acid, dried over anhydrous sodium sulfate, and evaporated under vacuum, dodecyl chloride being removed in the course of the evaporation, to yield n-dodecyl (3,5-di-t-butyl - 4 - hydroxybenzyl)benzenephosphinate which is triturated with acetonitrile and recrystallized from acetone, M.P. 67.5–69.5° C.

n - Octadecyl (3,5 - di - t - butyl - 4 - hydroxybenzyl) benzenephosphinate, M.P. 80–82° C., is obtained in a

EXAMPLE 8

S-(n-octyl) (3,5-di-t-butyl-4-hydroxybenzyl)-
benzenethiophosphinate

A solution of 14.7 parts of aluminum chloride (0.110 mole) in 50 ml. of nitromethane is added at −15° C. to −10° C. in a dropwise fashion over 10 minutes to a solution of 25.4 g. of 3,5-di-t-butyl-4-hydroxybenzyl chloride (0.100 mole) and 18.7 g. of dichlorophenylphosphine (0.105 mole) in 50 ml. of nitromethane. The reaction mixture is stirred at −15° to −10° C. for 45 minutes and 32.9 g. of n-octanethiol (0.224 mole) is added at −15° C. and the temperature then allowed to reach 20° C. over one hour. The reaction mixture is then held at 0 to +3° C. for 2 hours and then warmed to 55° C. for 2¼ hours. One hundred milliliters of water are next added dropwise at 20° to 45° C. over a period of 15 minutes and the dispersion is then held at room temperature for 16 hours. The organic phase is separated and washed twice with 100 ml. of water containing 20 ml. of concentrated aqueous hydrochloric acid, 50 ml. of ether being added at this stage to aid phase separation. The organic phase is dried over anhydrous sodium sulfate, after which the organic solvents are completely removed in a rotating film type evaporator, initially at 20 mm. Hg pressure and finally at 0.2 mm. Hg pressure. The residual oil is topped twice in a falling film type molecular still at a wall temperature of 125° to 130° C. and a pressure of 1 to 3 microns of Hg, the process being repeated at a wall temperature of 150–160° C. to yield the residual product as an oil.

*Analysis.*—Calc'd (percent): P, 6.34. Found (percent): P, 6.75.

S - (n - hexadecyl) (3,5 - di - t - butyl - 4 - hydroxybenzyl) - benzenethiophosphinate is likewise obtained if n-hexadecanethiol is substituted for n-octanethiol.

EXAMPLE 9

2,2-dimethyl-3-hydroxypropyl
(3,5-di-t-butyl-4-hydroxybenzyl)benzenephosphinate

A solution of 14.7 g. of aluminum chloride (0.110 mole) in 50 ml. of nitromethane is added dropwise at −15° to −12° C. over a period of 15 minutes to a solution of 25.4 g. of 3,5 - di - t - butyl - 4 - hydroxybenzyl chloride (0.100 mole) and 18.7 g. of dichlorophenylphosphine (0.105 mole) in 50 ml. of nitromethane. The reaction mixture is stirred at −12° C. for 45 minutes and 14 g. of neopentyl glycol are added gradually over a period of 10 minutes, the temperature being allowed to rise from −10° to 0° C. The reaction mixture is then stirred at 18° to 22° C. for 3 hours and 100 ml. of water are added in a dropwise fashion at −10° to +15° C. The aqueous dispersion is extracted with 300 ml. of ether and these extracts are washed with 100 ml. of 2% aqueous hydrochloric acid, dried over anhydrous sodium sulfate and evaporated to yield 2,2-dimethyl - 3 - hydroxypropyl (3,5 - di - t - butyl - 4 - hydroxybenzyl)benzenephosphinate which is further purified through recrystallization from 11:1 heptane: toluene, M.P. 113–115° C.

EXAMPLE 10

Diphenyl 3,5-di-t-butyl-4-hydroxybenzylphosphine
oxide

A solution of 14.7 g. of aluminum chloride (0.110 mole) in 50 ml. of nitromethane is added dropwise at −12° C. over a period of 20 minutes to a solution of 25.4 g. of 3,5-di - t - butyl - 4 - hydroxybenzyl chloride (0.100 mole) and 22.0 g. of chlorodiphenylphosphine (0.100 mole) in 50 ml. of nitromethane. The reaction mixture is stirred for 1 hour at −12° C. and 50 ml. of 6 N aqueous hydrochloric acid are then added dropwise from −10° to +10° C. One hundred milliliters of water are next added and the reaction mixture is stirred for about 1 hour to yield diphenyl 3,5 - di - t - butyl - 4 - hydroxybenzylphosphine oxide which is collected by filtration and further purified through successive recrystallization from toluene and acetone, M.P. 177.5–179° C.

EXAMPLE 11

By substituting an equivalent amount of 1-(3,5-di-t-butyl-4 - hydroxyphenyl)-2-chloroethane for 3,5-di-t-butyl-4-hydroxybenzyl chloride in the procedure of Example 1, there is obtained upon completion of the steps therein described, [2 - (3,5 - di-t-butyl-4-hydroxyphenyl)-ethyl]benzenephosphinic acid.

If alternatively this same substitution is made in the procedure of Example 4, there is obtained 2-(3,5-di-t-butyl - 4 - hydroxyphenyl)ethylphosphonyl dichloride. Modification of this latter procedure by use of an excess of water, i.e., as described in Example 2, yields with the foregoing substitution, 2-(3,5-di-t-butyl-4-hydroxyphenyl)ethylphosphonic acid.

EXAMPLE 12

Use of ethyldichlorophosphine in place of phenyldichlorophosphine in the procedure of Example 5 yields upon completion of the steps therein described, methyl (3,5 - di-t-butyl - 4 - hydroxybenzyl)ethanephosphinate. Likewise by employing cyclohexyldichlorophosphine there is obtained methyl (3,5-di-t-butyl-4-hydroxybenzyl) cyclohexanephosphinate.

Other hydrocarbondichlorophophines are likewise substituted to yield the corresponding hydrocarbonphosphinates, or if dissociation is conducted simply with water, the corresponding hydrocarbonphosphinic acids.

EXAMPLE 13

If 3-methyl-4-hydroxy-5-t-butylbenzyl chloride is substituted in molar equivalent amounts in the procedure of Example 2, there is obtained 3-methyl-4-hydroxy-5-t-butylbenzylphosphonic acid.

Likewise from 3,5-di-t-octyl-4-hydroxybenzyl chloride there is obtained 3,5 - di - t - octyl-4-hydroxybenzylphosphinate.

EXAMPLE 14

O-(n-butyl)-3,5-di-t-butyl-4-hydroxybenzylphosphonic
acid

A solution of 14.7 g. of aluminum chloride (0.110 mole) in 50 ml. of nitromethane is added dropwise at −16° to −12° C. over a period of one hour to a solution of 15.9 g. of n-butoxydichlorophosphine (0.100 mole) and 25.4 g. of 3,5-di-t-butyl-4-hydroxybenzyl chloride (0.100 mole) in 50 ml. of nitromethane. The reaction is stirred at −17° to −15° C. for 2⅓ hours and 50 ml. of 6 N hydrochloric acid are then added in a dropwise fashion at −15° to −12° C., followed by 125 ml. of water at −10° to 5° C. The reaction mixture is stirred for 30 minutes at 0° C. and extracted with 500 ml. of ether. These extracts are dried over anhydrous sodium sulfate and evaporated to dryness under vacuum. The residue is dissolved in 250 ml. of benzene and extracted twice with 250 ml. portions of 5% aqueous sodium bicarbonate solution. The sodium bicarbonate extracts are rendered acidic with aqueous concentrated hydrochloric acid and extracted with 500 ml. of ether. These ethereal extracts are dried over anhydrous sodium sulfate and evaporated under vacuum. The residue is triturated with 150 ml. of n-heptane, the solid 3,5-di-t-butyl-4-hydroxybenzylphosphonic acid byproduct being collected. The heptane solution is evaporated to dryness under reduced pressure to yield O-(n-butyl)-3,5-di-t-butyl-4-hydroxybenzylphosphonic acid which is further purified through recrystallization from petroleum ether.

EXAMPLE 15

Substitution of equivalent amounts of phosphorus tribromide for phosphorus trichloride and of 3,5-di-t-butyl-4-hydroxybenzyl bromide for 3,5-di-t-butyl-4-hydroxybenzyl chloride in the procedure of Example 2 results in formation of 3,5-di-t-butyl-4-hydroxy-benzylphosphonic acid in comparable yield and of equal purity.

EXAMPLE 16

By substituting isopropanol for methanol in the procedure of Example 5, there is obtained isopropyl (3,5-di-t-butyl - 4 - hydroxybenzyl)benzenephosphinate, M.P. 161–162° C.

Likewise if allyl alcohol is utilized, the corresponding allyl phosphinate is obtained M.P. 105–106° C.

EXAMPLE 17

(3,5-di-t-butyl-4-hydrobenzyl)-benzenephosphinic acid

A solution of 16.2 g. of anhydrous ferric chloride (0.100 mole) in 100 ml. of nitromethane, prepared at 15 to 20° C., is added dropwise over a period of 15 minutes to a solution of 17.9 g. of phenyldichlorophosphine (0.100 mole) and 25.4 g. of 3,5-di-t-butyl-4-hydroxybenzyl chloride (0.100 mole) in 50 ml. of nitromethane at −15 to −8° C. The reaction mixture is stirred at −12° C. for 1.25 hours and 50 ml. of 6 N hydrochloric acid is then added dropwise at 0° C., followed by 100 ml. of water. The organic phase is separated, washed with 50 ml. of dilute hydrochloric acid, dried over anhydrous sodium sulfate, and evaporated in vacuo. The residue is treated with 500 ml. of a solution of 20 g. of sodium hydroxide in water and warmed at steam bath temperatures for 30 minutes. The brown dispersion is filtered to remove precipitated ferric hydroxide, the precipitate being washed with water and the combined filtrate and washings are rendered acidic with 50 ml. of 6 N hydrochloric acid. The precipitate is filtered, triturated with heptane and air-dried to yield (3,5-di-t-butyl-4-hydroxybenzyl)benzenephosphinic acid which is recrystallized from nitromethane, M.P. 183–185° C.

EXAMPLE 18

(3,5-di-t-butyl-4-hydroxybenzyl)-benzenephosphinic acid

A solution of 13.0 g. of stannic chloride (0.05 mole) in 50 ml. of nitromethane at −10° C. is added dropwise at −15 to −10° C. over a period of 15 minutes to a solution of 12.7 g. of 3,5-di-t-butyl-4-hydroxybenzyl chloride (0.05 mole) and 8.95 g. of phenyldichlorophosphine (0.05 mole) in 100 ml. of nitromethane. The reaction solution is stirred at −15 to −12° C. for two hours, after which 50 ml. of 6 N hydrochloric acid is cautiously added dropwise at 0° C., followed by 100 ml. of water. The reaction mixture is extracted with 300 ml. of ether and these extracts are dried over sodium sulfate and evaporated in vacuo. The residue is dissolved in 400 ml. of a solution of 20 g. of sodium hydroxide in water and the solution filtered. The solution is rendered acidic with dilute hydrochloric acid and extracted with 250 ml. of ether and 250 ml. of benzene. The combined organic extracts are dried over sodium sulfate and evaporated in vacuo to yield (3,5-di-t-butyl-4-hydroxy-benzyl)benzenephosphinic acid which is recrystallized from nitromethane, M.P. 182–184° C.

EXAMPLE 19

(3,5-di-t-butyl-4-hydroxybenzyl)-benzenephosphinic acid

Boron trifluoride etherate (14.2 g.) is added dropwise at −5 to +5° C. over a period of 15 minutes to a solution of 17.9 g. of phenyldichlorophosphine (0.100 mole) and 25.4 g. of 3,5-di-t-butyl-4-hydroxybenzyl chloride (0.100 mole) in 100 ml. of nitromethane. The reaction mixture is stirred at room temperature for 3 hours and 100 ml. of water are added with cooling at −15° C. The mixture is then allowed to attain room temperature and diluted with 300 ml. of ether. The ether layer is separated and dried over sodium sulfate, and evaporated in vacuo to yield (3,5-di-t-butyl-4-hydroxybenzyl)benzenephosphinic acid which is recrystallized from nitromethane, M.P. 181–183° C.

EXAMPLE 20

(3,5-di-t-butyl-4-hydroxybenzyl)-benzenephosphinic acid

A solution of 18.9 g. of titanium tetrachloride (0.100 mole) in 100 ml. of nitromethane, is added at −15° C. to +5° C. over a period of 20 minutes to a solution of 25.4 g. of 3,5-di-t-butyl-4-hydroxybenzyl chloride (0.100 mole) and 18.7 g. of phenyldichlorophosphine in 50 ml. of nitromethane. The reaction mixture is stirred for 1½ hours at this temperature and 50 ml. of aqueous 6 N hydrochloric acid is then added dropwise at −10 to 0° C., followed by 100 ml. of water. The reaction mixture is allowed to attain room temperature and extracted with 300 ml. of ether. These extracts are washed with 150 ml. of 2 N hydrochloric acid, dried over anhydrous sodium sulfate and evaporated in vacuo. The residue is treated with about 800 ml. of an aqueous sodium hydroxide solution containing 20 g. of sodium hydroxide. The aqueous sodium hydroxide solution is filtered and rendered acidic to pH 1 with 6 N hydrochloric acid and extracted with 500 ml. of ether. These extracts are dried over sodium sulfate and evaporated in vacuo to yield (3,5-di-t-butyl-4-hydroxybenzyl)benzenephosphinic acid which is recrystallized twice from nitromethane, M.P. 183–185° C.

EXAMPLE 21

(3,5-di-t-butyl-4-hydroxybenzyl)-benzenephosphinothioic acid

Anhydrous aluminum chloride (14.6 g., 0.110 mole) is added to 50 ml. of nitromethane at −10° C., the temperature being allowed to rise to +10° C. while the aluminum chloride is dissolved by stirring. The aluminum chloride solution is then added dropwise at −15° to −12° C. over a period of 20 minutes to a solution of 18.8 g. of dichlorophenylphosphine (0.105 mole) and 3,5-di-t-butyl-4-hydroxybenzyl chloride (0.100 mole) in 50 ml. of nitromethane. After the addition is complete, the reaction mixture is stirred at −15 to −12° C. for 45 minutes and about 16 g. of anhydrous hydrogen sulfide gas are then bubbled into the reaction mixture at −10° to +10° C. over 5 hours. The homogeneous reaction mixture is allowed to stand for 19 hours and then cooled to −30° C. One hundred milliliters of water are cautiously added dropwise at −30° to −20° C., the addition being exothermic. The reaction product is next extracted with 500 ml. of ether. These extracts are separated and washed three times with saturated sodium chloride, dried over anhydrous sodium sulfate, and evaporated at reduced pressure initially at about 30 mm. Hg and finally at about 0.4 mm. Hg. The residue is triturated with 80 ml. of acetonitrile. The solid, which consists of 3,5-di-t-butyl-4-hydroxybenzyl)benzenephosphinic acid, is removed by filtration and the filtrate evaporated at reduced pressure to yield (3,5-di-t-butyl-4-hydroxybenzyl)benzenephosphinothioic acid as a glass, which can be crushed to an off-white powder.

What is claimed is:

1. The process which comprises treating an alkylated p-hydroxyphenylalkyl halide of the formula:

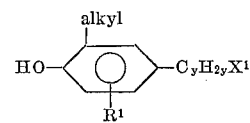

wherein
R$^1$ is hydrogen or alkyl in a position ortho or meta to the hydroxy group, said alkyl having up to 8 carbon atoms,
X$^1$ is chloro, bromo, or iodo, and Y has a value of from 1 to 18 inclusively with a phosphorus halide of the formula:

wherein
X² is chloro, bromo or iodo,
each of R² and R³ is chloro, bromo, iodo, alkyl, or alkoxy groups having up to 4 carbon atoms, or tolyl, naphthyl, chrysenyl, anthracyl, t-butylphenyl and the corresponding aryloxy groups, in the presence of a complexing metal halide Lewis acid in non-aqueous inert aprotic organic solvent, and treating the resultant complex with a quantity of a compound of the formula H₂Z, wherein Z is oxygen or sulfur, sufficient to dissociate the complex and liberate the corresponding alkylated hydroxyphenylalkylphosphoryl or -thiophosphoryl compound of the formula:

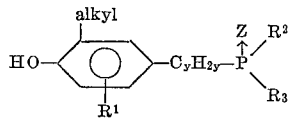

wherein R¹, R², R³, Z and Y are as defined above.

2. The process according to claim 1 wherein the complexing metal halide Lewis acid is aluminum chloride, titanium chloride, stannic chloride, ferric chloride or boron trifluoride etherate.

3. The process according to claim 1 wherein the complexing metal halide Lewis acid is aluminum chloride and the non-aqueous inert aprotic organic solvent is nitromethane.

4. The process according to claim 1 wherein X¹, X², R² and R³ are chloro and the complexing metal halide Lewis acid is aluminum chloride.

5. The process according to claim 4 wherein the resultant complex is treated with an excess of H₂Z sufficient to both dissociate the complex and to hydrolyze said alkylated hydrophenylalkylphosphoryl or -thiophosphoryl compound, thereby forming a phosphonic or thiophosphonic acid of the formula:

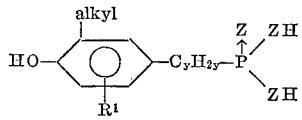

wherein Z, R¹ and y are as previously defined.

6. The process according to claim 5 wherein Z is oxygen.

7. The process according to claim 5 wherein the alkylated hydroxyphenylalkyl halide is 3,5-di-t-butyl-4-hydroxybenzyl chloride and Z is oxygen.

8. The process according to claim 4 wherein the resultant complex, prior to being treated with quantity of H₂Z sufficient to dissociate the complex, is first treated with an excess of an alcohol or mercaptan of the formula HZR⁴ wherein R⁴ is alkyl, chloroalkyl or hydroxyalkyl groups having up to 18 carbon atoms, thereby forming a phosphinate or thiophosphinate of the formula:

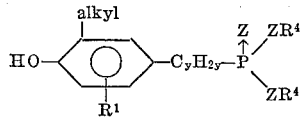

wherein Z, R¹, R⁴ and y are as previously defined.

9. The process according to claim 8 wherein Z is oxygen.

10. The process according to claim 8 wherein the alkylated hydroxyphenyl alkyl halide is 3,5-di-t-butyl-4-hydroxybenzyl chloride, R⁴ is alkyl of from 1 to 30 carbon atoms, and Z is oxygen.

11. The process according to claim 10 wherein R⁴ is methyl.

12. The process according to claim 1 wherein X¹, X² and R² are chloro, R³ is alkyl or aryl and the complexing metal halide Lewis acid is aluminum chloride.

13. The process according to claim 12 wherein the resultant complex is treated with an excess of H₂Z sufficient to both dissociate the complex and to hydrolyze said alkylated hydroxyphenylalkyl phosphoryl or -thiophosphoryl compound, thereby forming a phosphinic acid or thiophosphinic acid of the formula:

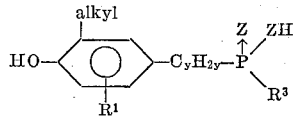

wherein A, R¹ and y are as previously defined and R³ is alkyl or aryl.

14. The process according to claim 13 wherein A is oxygen.

15. The process according to claim 13 wherein the alkylated hydroxyphenylalkyl halide is 3,5-di-t-butyl-4-hydroxybenzyl chloride, and the phosphorus halide is phenylphosphorus dichloride and Z is oxygen.

16. The process according to claim 12 wherein the resultant complex, prior to being treated with a quantity of H₂Z sufficient to dissociate the complex, is first treated with an excess of an alcohol or mercaptan of the formula HZR⁴ wherein R⁴ is alkyl, chloroalkyl or hydroxyalkyl group having up to 18 carbon atoms, thereby forming a phosphinate or thiophosphinate of the formula:

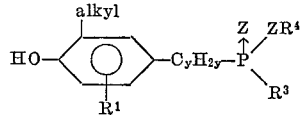

wherein R¹, R⁴ and y are as previously defined and R³ is alkyl or tolyl.

17. The process according to claim 16 wherein Z is oxygen.

18. The process according to claim 16 wherein the alkylated hydroxyphenylalkyl halide is 3,5-di-t-butyl-4-hydroxylbenzyl chloride, the phosphorus halide is phenylphosphonous dichloride, R⁴ is alkyl of from 1 to 18 carbon atoms and Z is oxygen.

19. The process according to claim 1 wherein X¹ and X² are chloro and each of R² and R³ is alkyl or tolyl and the complexing metal halide is aluminum chloride, thereby forming a phosphine oxide or sulfide of the formula:

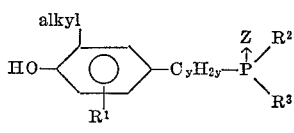

wherein R¹, Z and y are as previously defined and each of R² and R³ is alkyl or tolyl.

20. The process according to claim 19 wherein the alkylated hydroxyphenylalkyl halide is 3,5-di-t-butyl-4-hydroxybenzyl chloride, the phosphorus halide is chlorodiphenylphosphine and Z is oxygen.

References Cited

FOREIGN PATENTS 707,961  4/1954  Great Britain.

OTHER REFERENCES

Kinnear et al.: "J. of the Chem. Soc." (London) (1952) pp. 3437–3445.

CHARLES B. PARKER, Primary Examiner

A. H. SUTTO, Assistant Examiner

U.S. Cl. X.R.

252—400; 260—502.4, 543, 953

UNITED STATES PATENT OFFICE
CERTIFICATE OF CORRECTION

GC 256

Patent No. 3,534,127  Dated October 13, 1970

Inventor(s) John D. Spivack

It is certified that error appears in the above-identified patent and that said Letters Patent are hereby corrected as shown below:

In Column 1, formula I, "NO" should read --HO--

In Column 2, formula II, "$R^3$" should read --$R^2$--

In Claim 13, line 15, "A" should read --Z--

SIGNED AND
SEALED
FEB 9 1971

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,534,127      Dated October 13, 1970

Inventor(s) John D. Spivack

It is certified that error appears in the above-identified patent and that said Letters Patent are hereby corrected as shown below:

In Claim 8, line 61, "phosphinate or thiophosphinate" should read --phosphonate or thiophosphonate--

Signed and sealed this 13th day of April 1971.

(SEAL)
Attest:

EDWARD M. FLETCHER, JR.
Attesting Officer

WILLIAM E. SCHUYLER, JR.
Commissioner of Patents